Oct. 27, 1925.  1,558,975
E. K. GALWEY
AEROPLANE
Filed Oct. 30, 1922   4 Sheets-Sheet 4

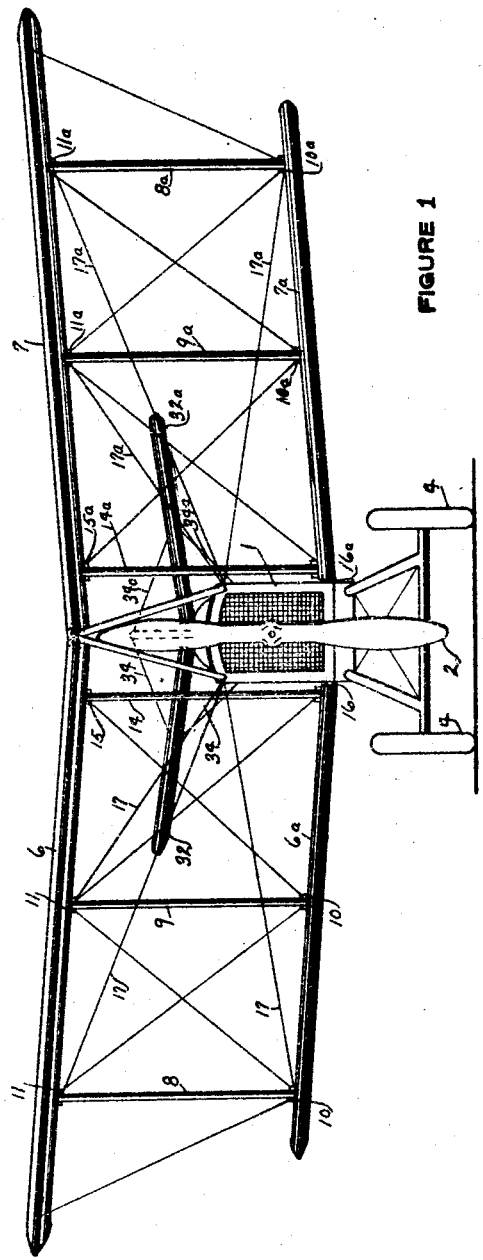

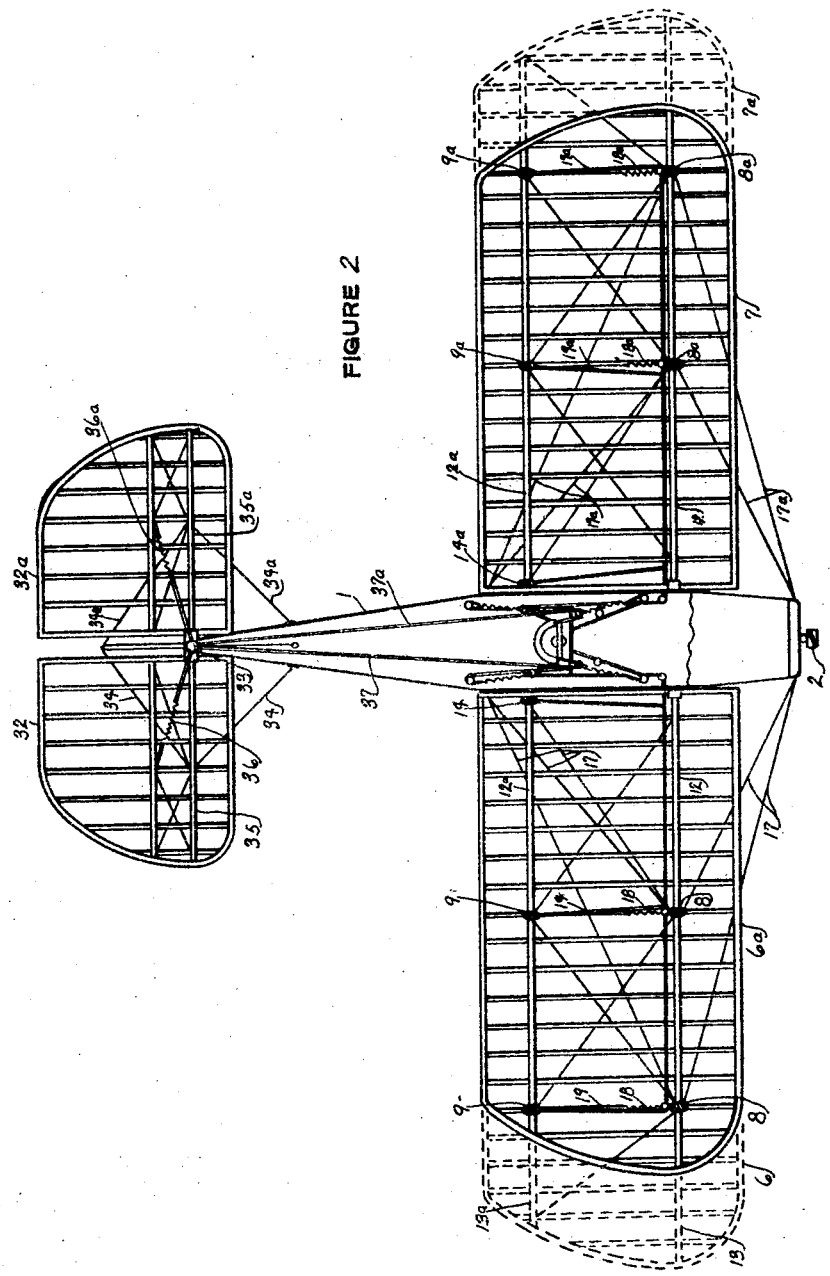

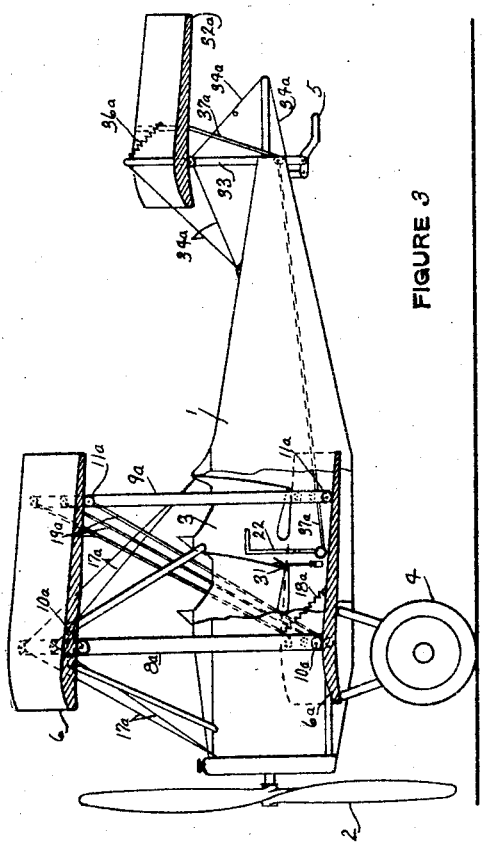
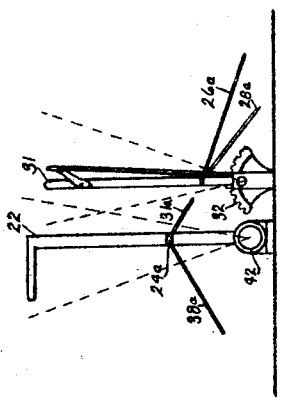

INVENTOR
Edward K. Galwey
John A. Naismith
BY
ATTORNEY

Patented Oct. 27, 1925.

1,558,975

UNITED STATES PATENT OFFICE.

EDWARD K. GALWEY, OF SAN JOSE, CALIFORNIA, ASSIGNOR OF ONE-HALF TO FRANK W. CAILLAT, OF SAN JOSE, CALIFORNIA.

AEROPLANE.

Application filed October 30, 1922. Serial No. 597,931.

*To all whom it may concern:*

Be it known that I, EDWARD K. GALWEY, a citizen of the United States, and resident of San Jose, in the county of Santa Clara and State of California, have invented certain new and useful Improvements in Aeroplanes, of which the following is a specification.

There are certain qualifications that must be present in an aeroplane to render it highly successful in all phases of its possible commercial life.

These qualifications may be stated briefly as follows, namely: First, it should have a large measure of inherent stability whereby to relieve the operator as much as possible of the incessant watchfulness ordinarily required. Second, it must have a simple control that is highly and instantly effective whenever applied, and one that will be sensitive to angular adjustments and speed effects whereby to keep the operator constantly informed when a dangerous angle or speed has been reached. Third, it should have a low landing speed whereby it may land in restricted areas and under adverse circumstances, and yet it should be capable of acquiring any speed suitable for usual commercial or pleasure purposes.

It is the object of my invention to provide an aeroplane so constructed, arranged and operated as to satisfactorily meet the above mentioned requirements.

It is a further object of my invention to provide a simple, novel and highly efficient controlling means for an aeroplane of the character indicated.

It is more particularly an object of my invention to provide resilient connections to each of the movable parts of the aeroplane and a central control so arranged that a movement of the control will operate oppositely arranged parts in opposite directions.

It is a still further object of my invention to provide a resiliently constructed aeroplane whereby to lengthen its life by reducing vibrations, stresses and shocks, and one in which stability is instinctively maintained or to any desired degree upset by the operator thereof.

Finally it is an object of my invention to provide resilient supports for the above mentioned resilient connections and means for varying the tension of said supports whereby controlled elasticity of the operating cords is secured to assist in producing the results herein set forth.

With these and other objects in view, reference is had to the accompanying drawings forming a part of this specification, in which,—

Figure 1 is a front elevation of my improved aeroplane.

Figure 2 is a plan view of the same, parts being broken away.

Figure 3 is a side elevation of the same, parts broken away and partly in section.

Figure 4 is a side elevation of the control levers showing cable connections thereto.

Figure 5:
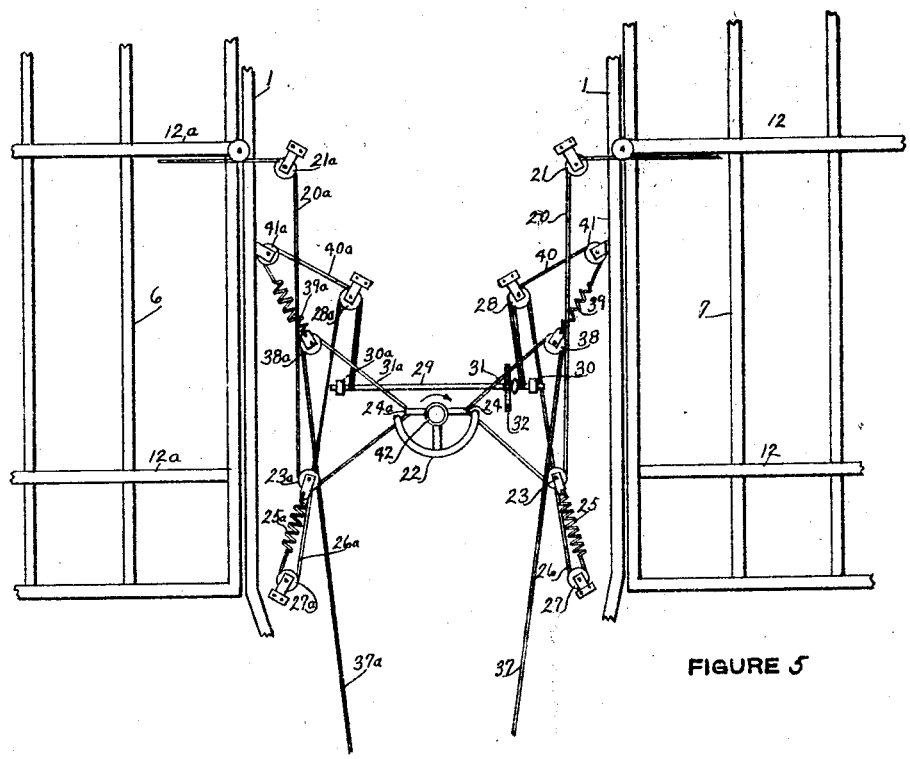
Figure 5 is a diagrammatical illustration showing the arrangement of the controlling cables.
Figure 6:
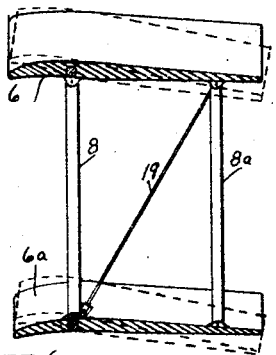
Figure 6 is a diagrammatical illustration showing the operation of the side planes.
Figure 7:
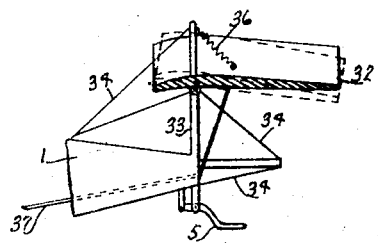
Figure 7 is a detail illustration showing operation of the tail planes.
Figure 8:
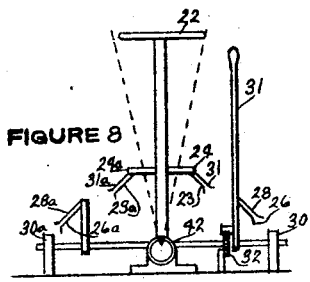
Figure 8 is a front elevation of the control levers showing cable connections thereto.

Referring more particularly to the drawing, I show at 1 the fuselage of my improved aeroplane, the propeller being shown at 2 and the cock-pit at 3, the landing wheels being indicated by the numeral 4 and the rear landing shoe by the numeral 5.

In the embodiment of my invention herein disclosed, I have illustrated a bi-plane, each pair of side planes 6—6ª, 7—7ª being spaced by struts as 8—8ª, 9—9ª pivotally connected to the planes as at 10—10ª, 11—11ª and to longitudinal spars 12—12ª, 13—13ª forming a part thereof adjacent their forward edges. The several planes are arranged on fuselage 1 as shown, to form a dihedral angle, the inner ends of spars 12—12ª of said upper plane being supported by fixed struts 14—14ª to which they are pivoted as at 15—15ª, and the inner end of the spars 13—13ª of said lower plane being pivotally connected to the fuselage 1 as at 16—16ª. These spars 12—12ª, 13—13ª are held in fixed positions with relation to fuselage 1 by suitable cables as shown at 17—17ª secured thereto and to suitable parts of fuselage 1. Each of the forward struts 8—8ª is connected near its lower end to the upper surface of the lower plane pivotally mounted thereon, by a spring as 18—18ª whereby the planes are normally held under a tension acting against other resilient members hereinafter described.

The result of this construction is that the planes form a predetermined dihedral angle, but at the same time are permitted to pivot about their forward longitudinal spars 12—12$^a$, 13—13$^a$ whereby their incidence relative to the air stream may be varied within structural limitations. Since planes 6 and 7 are connected by struts as described they must necessarily move in unison, as likewise do planes 6$^a$—7$^a$.

At 19 and 19$^a$ are shown cables attached to the upper ends of struts 9—9$^a$ and passing forwardly and downwardly over sheaves arranged at the bottom of struts 8—8$^a$ and joined to form a single cable as 20—20$^a$. This single cable passes into fuselage 1 and around a sheave as at 21—21$^a$, thence rearwardly of the fuselage a distance past control lever 22 to engage a second sheave as 23—23$^a$, and thence back a distance and secured to the outer end of an arm 24—24$^a$ extending outwardly from control lever 22. The sheaves 23—23$^a$ are mounted on springs 25—25$^a$ which are inserted in cables 26—26$^a$, the latter passing over sheaves 27—27$^a$ mounted as shown, the sheaves 21—27 and arm 24 and 21—27$^a$ and 24$^a$ forming two triangles in opposed relation to each other and joined at their apices by arms 24—24$^a$ actuated by the single control 22. From sheaves 27—27$^a$ the cables 26—26$^a$ are carried a distance forwardly of control 22 and passed over sheaves 28—28$^a$ and thence rearwardly again to a shaft 29 revolubly mounted in bearings 30 and rotated by a lever 31 secured in any desired position by locking device 32.

By means of this construction, if control 22 is moved a distance, say, to the right, then through the medium of cables 19$^a$ and 20$^a$ the rear of the planes 6$^a$ and 7$^a$ are drawn downwardly a distance against the tension of springs 18$^a$. At the same time the cables 19 and 20 are released to some degree and springs 18 draw the rear of planes 6 and 7 upwardly a distance equal to that which the planes 6$^a$ and 7$^a$ are lowered. Of course if the lever 22 is turned in the opposite direction then the movements of the planes are reversed.

The construction and operation of the tail planes is similar to that of the side planes. The tail planes 32—32$^a$ form a dihedral angle and they are mounted on a support 33 held in position by cables 34—34$^a$. These planes pivot on a longitudinal rib 35—35$^a$, and they are connected to the upper end of support 33 by springs 36—36$^a$. These planes are operated by cables 37—37$^a$ connected thereto and operating against the tension of springs 36—36$^a$ and passing through the fuselage 1 to sheaves 38—38$^a$ located a distance forwardly of control 22 and thence back to arms 24—24$^a$ to which they are attached opposite the attachment of cables 20—20$^a$ thereto. Sheaves 38 and 38$^a$ are supported by springs 39—39$^a$ which are inserted in cables 40—40$^a$ passing over sheaves 41—41$^a$ located forward of sheaves 28—28$^a$ and thence over said sheaves 28—28$^a$ to shaft 29 to which they are attached.

It is obvious from the foregoing that when the control 22 is turned in the direction indicated by the arrow it will not only drop the left plane and raise the right, but it will also drop the right tail plane and raise the left tail plane.

The control 22 is mounted upon a ball and socket joint at 42 and the arms 24—24$^a$ are mounted thereon a distance above said joint. Besides the turning movements above set forth, therefore, the control 22 may be thrown directly forward to lower both side planes and raise both tail planes or it may be thrown backwardly to accomplish just the opposite result. In fact the control 22 may be moved in any direction around its pivotal point and the several side and tail wings moved to any desired extent whereby the incidence of the whole machine may be changed laterally, longitudinally or diagonally at will.

Since springs 25—25$^a$ support cables 20—20$^a$, and springs 39—39$^a$ support cables 37—37$^a$, it is clear that the tension on said cables may be increased or decreased as desired by operating lever 31 in the proper direction. By varying the tension on the cables mentioned the sensitiveness of the wings to which they are attached, to varying pressures in the air stream, may be increased or decreased at will and fatigue is practically eliminated. Also by incorporating springs in the structure as described the life of the structure is greatly prolonged, the same absorbing vibrations and shocks that would otherwise effect the more rigid parts of the aeroplane. Furthermore, the flexibility of the machine together with its high controllability permits the use of a light structure with a consequent gain in speed, and also it permits landing in restricted areas at low landing speed.

It should now be clear that I have provided an areoplane that has a large measure of inherent stability, and a highly sensitive, but single control. The stability is secured because the whole planes operate as ailerons, the low center of gravity and the automatic change of the angle of incidence of the planes with relation to the air stream because the total wing surfaces (side and tail) are properly adjustable with relation to each other and the air stream. High controllability is secured because all these adjustable members are resiliently hung and are operated from a single lever freely movable in every direction about its pivoted end.

One of the most important results obtained by means of the construction described is that it affords a maximum degree of safety. For instance, any outside force applied to any wing surface and moving in any direction is instantly counterbalanced by an opposite movement of the opposite wing through the resilient connections described. The result of this is that if, say one or two of the cables 17 break so that the resistance to the upward pull of springs 18 is decreased and the planes 6—7 swing upwardly, then the remaining cable 17 instantly actuates lever 22 and the cable connections 20$^a$ and 17$^a$ to swing planes 6$^a$—7$^a$ downwardly an equal degree. At the same time the cables 37—37$^a$ operate to raise tail plane 37 and lower tail plane 37$^a$.

In a case like this, while the operator of the machine may not be able to drive it in a straight line he could control its flight to find a safe landing. The automatic relative adjustment of the several planes therefore not only removes the necessity of the driver to adjust the planes to every variation in air currents, but actually accommodates the machine to sudden breakage more quickly than the operator himself could effect the necessary adjustments.

The ability of my improved form of aeroplane to soar is clearly indicated by the foregoing description. In the case of the usual form of aeroplane it is so heavily loaded and so rigid in construction that a gust of air striking the planes from below and in front tends to force it upwardly and backwardly thereby making it become tail heavy and threatening to throw it into a tail spin. In my improved form of aeroplane the result is different. The whole structure is light and flexible and the planes are automatically and instantly swung into a new position to meet the changed air current and the plane rides or volplanes forwardly on the rising air current without, perhaps, materially changing its former level. This illustration may be elaborated upon to show that my improved aeroplane is capable of reaching and maintaining a high degree of flying efficiency under any ordinary atmospheric conditions permitting the soaring flight of birds.

It may now be seen that I have provided an aeroplane that combines lightness with power, strength and speed, and high controllability with inherent stability.

It is to be understood, of course, that while I have herein disclosed one specific embodiment of my invention, changes in form, proportions, construction and method of operation may be made within the scope of the appended claims.

I claim:—

1. An aeroplane comprising a fuselage, a forwardly tiltable plane mounted on each side thereof, forwardly tiltable tail planes, a control member, cable connections between the latter and each plane, guide pulleys for the cable connections, resilient means supporting the guide pulleys, and adjustable means connected to the resilient supporting means for adjusting the tension of the latter.

2. An aeroplane comprising a fuselage, right and left body planes carried thereby for tilting movement, right and left tail planes tiltably mounted, means yieldably holding the planes in their normal position, means for varying the sensitiveness in the movement of the planes, and a single control for simultaneously tilting one body plane and the opposite tail plane and imparting a reverse movement to the other planes.

3. An aeroplane comprising a fuselage, right and left planes tiltably mounted thereon, a control member, a flexible connection between each plane and the control member whereby on operation of the latter the inclination of the planes may be varied, and a resiliently and adjustably mounted idler pulley for tensioning each flexible connection and over which the latter takes.

4. An aeroplane comprising a fuselage, right and left planes tiltably mounted thereon, a control member, a flexible connection between each plane and the control member whereby on operation of the latter the inclination of the planes may be varied, a resiliently mounted guide for each flexible connection, and means for varying the tension in the mounting of said guides.

5. An aeroplane comprising a fuselage, tiltable planes mounted on opposite sides thereof, tiltable tail planes, a control member, a flexible connection between each plane and the control member whereby movement of the latter will simultaneously tilt the first planes in opposite directions and the first and tail planes in diagonally opposite directions, guide means for the flexible connections, a rotatable shaft, and a flexible resilient connection between each guide means and the shaft.

6. An aeroplane comprising a fuselage, vertically spaced planes tiltably mounted thereon, forward and rearward struts spacing the planes and pivotally connected at their upper and lower ends thereto and forming therewith parallelograms, a flexible connection fixed at one corner of the parallelograms and extending diagonally thereacross, a guide arranged at the diagonally opposite corner of the parallelogram for guiding the flexible member to a point of control whereby a pull on said flexible member will tend to shorten said diagonal distance, and means for restoring said diagonal distance to normal.

EDWARD K. GALWEY.